United States Patent
Morse et al.

(10) Patent No.: US 8,326,764 B1
(45) Date of Patent: Dec. 4, 2012

(54) FACTORY AUTOMATION TRANSACTIONS

(75) Inventors: Richard A. Morse, Hudson, OH (US); Randall A. Marquardt, Waukesha, WI (US); Michael D. Kalan, Highland Heights, OH (US); John J. Baier, Mentor, OH (US); David W. Farchmin, Grafton, WI (US); Stephen C. Briant, Moon Township, PA (US); Sujeet Chand, Brookfield, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 2255 days.

(21) Appl. No.: 10/955,547

(22) Filed: Sep. 30, 2004

(51) Int. Cl.
*G06Q 20/00* (2012.01)
*G05B 19/00* (2006.01)

(52) U.S. Cl. .......................... 705/64; 340/5.1
(58) Field of Classification Search ............ 705/64
See application file for complete search history.

(56) References Cited

U.S. PATENT DOCUMENTS

| | | | |
|---|---|---|---|
| 5,892,900 A * | 4/1999 | Ginter et al. | 726/26 |
| 5,956,489 A | 9/1999 | San Andres et al. | |
| 6,266,669 B1 | 7/2001 | Brodersen et al. | |
| 6,397,227 B1 | 5/2002 | Klein et al. | |
| 6,477,667 B1 * | 11/2002 | Levi et al. | 714/57 |
| 6,686,838 B1 * | 2/2004 | Rezvani et al. | 340/506 |
| 6,728,588 B2 | 4/2004 | Cho et al. | |
| 6,823,355 B1 | 11/2004 | Novaes et al. | |
| 6,934,755 B1 * | 8/2005 | Saulpaugh et al. | 709/226 |
| 7,456,736 B2 * | 11/2008 | Primm et al. | 340/540 |
| 7,784,030 B2 * | 8/2010 | Christfort et al. | 717/120 |
| 2005/0172170 A1 * | 8/2005 | Thieret et al. | 714/37 |

* cited by examiner

*Primary Examiner* — Calvin L Hewitt, II
*Assistant Examiner* — Zeshan Qayyum
(74) *Attorney, Agent, or Firm* — Turocy & Watson, LLP; Alexander R. Kuszewski; John M. Miller

(57) ABSTRACT

A system that facilitates direct communication of a transaction between an automation controller and a business system comprises a request analyzer that receives a request for data relating to the automation controller and locates a transaction definition within the automation controller based upon the request. A subscribing component subscribes the business system to the automation controller based at least in part upon the located transaction definition.

28 Claims, 13 Drawing Sheets

FACTORY AUTOMATION TRANSACTIONS

TECHNICAL FIELD

The subject invention relates generally to industrial system automation, and more particularly to enabling direct transactional communications between industrial automation systems and business systems.

BACKGROUND OF THE INVENTION

Introduction of business systems have enabled all sizes of businesses to benefit from technological advances. For example, a manager or other suitable business executive not particularly skilled in computers and their application can quickly and efficiently review data relating to a business with a few clicks of a mouse given an adequate business system. Moreover, many of today's business systems provide mechanisms for automatic or semi-automatic data trending and analysis, thereby delivering to a user structured data and analysis almost instantaneously compared to hours, days, or weeks such accumulation of data and analysis thereof would have required only a few years ago. Accordingly, business executives can make decisions based upon a reliable analysis from an accumulation of data. For a specific example, sales information with respect to disparate products can be compared/analyzed, wherein such comparison is utilized in connection with advertising strategies. Purchaser demographics, such as age of typical purchaser, gender of typical purchaser, etc. can be used and analyzed in connection with making various business decisions. Further development of business systems will only further improve general business practices.

Similar to technological advances furthering utilization and usability of business systems, advancements in technology have allowed many factory environments to become partially or completely automated in many circumstances, thus improving output in terms of both quality and efficiency. For example, applications that once required workers to put themselves proximate to heavy machinery and other various hazardous conditions can now be completed at a safe distance from such hazards. Further, imperfections associated with human action have been minimized through employment of highly precise machines. Many of these factory devices supply data related to manufacturing to databases that are accessible by system/process/project managers on a factory floor. For instance, sensors can detect a number of times a particular machine has completed an operation given a set amount of time. Further, sensors can deliver data to a processing unit relating to system alarms. Thus, a factory automation system can review collected data and automatically and/or semi-automatically schedule maintenance of a device, replacement of a device, and other various procedures that relate to automating a process.

While there is a substantial amount of data generated at a factory floor and viewable within a factory automation system, there is currently not a mechanism for directly transferring such industrial data to a business system. For instance, data generated in a factory environment and within an industrial automation system may be desirably relayed to a business system and reviewed by an executive in a business context rather than within an industrial context. Conventionally, middleware must be adopted to receive data from the industrial automation system and transform it to enable compatibility with a business system. Such middleware is expensive to design and implement, both in terms of man-hours and monetary costs. Further, if alterations are made to the business system and/or the industrial automation system, middleware that facilitates transactions between the systems will require modification by an expert in computer programming.

The aforementioned middleware also is subject to failures in communication, and further lacks sufficient security for communications/transactions between an industrial automation system and a business system. For example, conventional middleware systems do not enable complete rollback when a transaction has been completed. For instance, the business system can request certain data from the industrial automation system via the middleware. The middleware can then transform the data in order to render such data compatible with the business system. Thereafter, the business system can issue a confirmation of receipt, which is first handled by the middleware and then relayed to the industrial automation system. Accordingly, if there is a loss of power or other corruption that occurs while the middleware is operating on data, one party to the transaction may believe the operation is completed while the other party has not received data or completed the transaction. And as middleware is involved, conventional transactions between business systems and industrial automation systems cannot be rolled back (e.g., the transaction cannot be cancelled and re-started from the beginning). Furthermore, as additional software is required to complete transactions, security breaches can occur with respect to such additional software. Thus, a business system can validly request data from an industrial automation system, which is then delivered to middleware. The middleware, however, may have been subject to a security breach, thus delivering corrupt data to the business system. Therefore, the business system believes that it has received valid data when, in actuality, the data has been corrupted.

Accordingly, there exists a need in the art for a system and/or methodology for directly delivering communications between business systems and industrial automation systems.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject invention enables communications to occur directly between a business system and an industrial automation system. More particularly, the subject invention provides systems and methodologies that facilitate transactional communications directly between an automation controller and a business system database. For example, rather than the automation controller delivering data to middleware that thereafter modifies and relays such data to a business system database, the automation controller can initiate/complete a transaction directly with a business system database. Such direct transactions are enabled by defining available transactions and placing such definitions within the automation controller.

Further, these transactions can be related to particular data requested by a user of a business system, or the transactions can be related to data requested automatically by a software component or the like. For instance, a business system user may desire to receive information relating to a particular event/condition within an industrial environment. Specifically, the business system user may wish to receive information relating to an alarm of a particular device, set of devices, process, etc. The user can request such data, and an automation controller that includes a transaction definition relating to the requested data can be located. Thereafter a business system database can subscribe to the located automation controller (and the appropriate transaction), and the defined transaction between the business system database and the automation controller can be initiated upon occurrence of the alarm.

In accordance with one aspect of the subject invention, the event/condition that triggers a transaction directly between an automation controller and a business system database can be an alarm, completion of a process, a passing of a defined amount of time, or any other suitable event/condition that occurs within an industrial environment. For example, the event/condition can relate to a maintenance class of data, where alarms indicate when maintenance, repair, and/or replacement is required for one or more device(s)/process (es). Moreover, the event/condition can relate to production schedule data. For instance, the event/condition can be a pre-defined amount of time that has passed, and data relating to production schedule can be communicated directly between the business system database and the automation controller via a transaction. For example, an amount of tape remaining on a reel can be communicated between a business system and an automation controller periodically. Furthermore, a transaction between an automation controller and a business system database can relate to batch record data (e.g., data that relates to items ingested by humans or injected into humans). For instance, data relating to mass production of food or pharmaceuticals can be categorized as batch record data. In accordance with another aspect of the subject invention, transactions between an automation controller and a business system database can be fully rolled back. Thus, if there is a communication failure between the business system database and the automation controller, the respective entities can roll back the transaction, thereby rendering both entities in a substantially similar position as they had been prior to initialization of the transaction.

To the accomplishment of the foregoing and related ends, the invention then, comprises the features hereinafter fully described and particularly pointed out in the claims. The following description and the annexed drawings set forth in detail certain illustrative aspects of the invention. These aspects are indicative, however, of but a few of the various ways in which the principles of the invention may be employed and the subject invention is intended to include all such aspects and their equivalents. Other objects, advantages and novel features of the invention will become apparent from the following detailed description of the invention when considered in conjunction with the drawings.

DETAILED DESCRIPTION OF THE INVENTION

Figure 1:
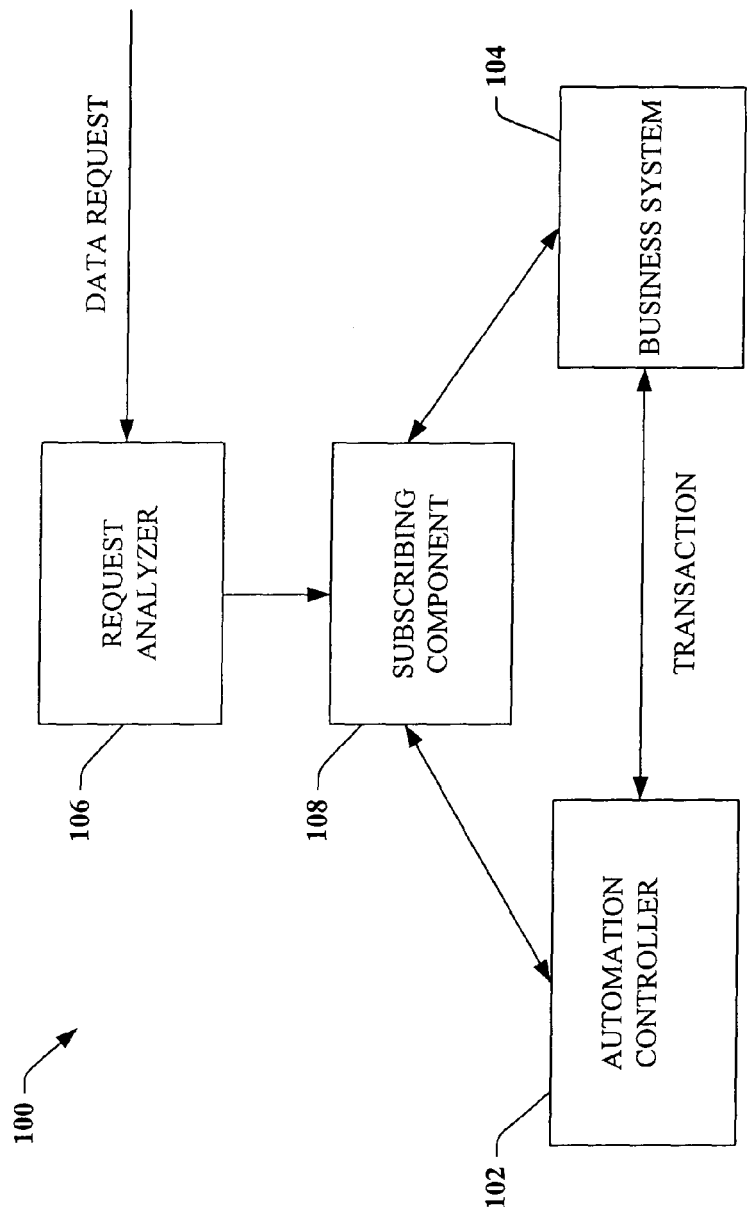
FIG. 1 is a high-level block diagram of a system that facilitates direct communication in a form of a transaction directly between a business system and an automation controller in accordance with an aspect of the subject invention.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Referring now to the drawings, FIG. 1 illustrates a high-level system overview in connection with one particular aspect of the subject invention. The subject invention relates to a novel system 100 that facilitates transactional communications between an automation controller and a business system. The system 100 includes an automation controller 102 and a business system 104, wherein a transactional communication is desired between such automation controller 102 and the business system 104. A transaction is a unit of interaction with a database management system (e.g., the business system 104) or similar system that is treated in a coherent and reliable way independent of other transactions. An ability to handle transactions ensures that integrity of databases within the automation controller 102 and the business system 104 is maintained. Often, a single transaction can require a plurality of queries between the automation controller 102 and the business system 104, where data is written to and extracted from both the automation controller 102 and the business system 104 several times prior to completion of the transaction.

To effectuate a direct transaction between the automation controller 102 and the business system 104, a request analyzer 106 receives a subscription request. The subscription request can originate manually from a user or can originate from a software component or other suitable automatic means. In accordance with one aspect of the subject invention, the subscription request will be related to a particular type of data. The request analyzer 106 can analyze the subscription request and locate a defined transaction that corresponds to such data. For example, if a user desired to receive data relating to a particular alarm/event, the request analyzer 106 can locate a transaction defined within the automation controller 102 that corresponds to the request. The defined transaction within the automation controller 102 should appear to the business system 104 as if such business system 104 is interacting with another business system (rather than the automation controller 102). Thus, utilizing the subject invention, the business system 104 (and other associated business systems) will not require modification to interact directly with the automation controller 102.

Upon the request being analyzed, a subscribing component 108 is employed to subscribe the business system 104 to the automation controller 102, wherein such automation controller 102 relates to the requested data. Such subscription allows the automation controller 102 (e.g., transaction originators within and/or related to the automation controller 102) to have knowledge of a location to deliver beginnings of a transaction. As shown in FIG. 1, the subscribing component 108 would inform the automation controller 102 that transactions should be delivered to the business system 104. More specifically, the automation controller 102 can have knowledge of a particular database within the business system 104 in which to deliver transaction data. Thus, a channel would be opened between the business system 104 and the automation controller 102, rather than between the business system 104 and a database server (not shown) that pulls data from the automation controller 102 as is the case with respect to conventional systems. Further, the automation controller 102 can operate conventionally with respect to other factory devices. For instance, the automation controller 102 can receive unsolicited transactions from upper-level systems, such as supervisory plan floor systems or enterprise level systems, in order to drive operations of plant devices.

The transaction itself can occur similar to that of conventional transactions between databases. For example, the system 100 can include full transactioning capabilities. Particularly, each transaction undertaken between the automation controller 102 and the business system 104 can be fully buffered and associated with rollback capabilities. Thus, the transaction can begin between the automation controller 102 and the business system 104, but will not be completed until the transaction has been committed by both the automation controller 102 and the business system 104. If several queries have been undertaken prior to commitment of both entities (e.g., if the transaction fails for any reason), the system 100 can rollback any changes to place the system 100 in the same position as it had been prior beginning the transaction. All other transactions will behave in a manner as if the failed transaction never existed.

In accordance with one aspect of the subject invention, the transaction between the automation controller 102 and the business system 104 can relate to several classes of data. Amongst the several data classes are maintenance data, production schedule data, and batch operation information data. The maintenance class of data includes alarms and events related to a maintenance diagnostic feature. For example, operational failures, operator pressing a button, status of tape on a real, and other suitable events/maintenance data are included within the maintenance data class. Thus, the request analyzer 106 can receive a subscription request related to a certain event, condition, and/or information relating to maintenance, and locate an automation controller that includes a defined transaction relating to such data. Thereafter, the subscribing component 108 can open a channel between the automation controller 102 and the business system 104. Upon a passed period of time and/or occurrence of an event, either the automation controller 102 or the business system 104 can request a transaction therebetween.

Another class of data that can be subject to transactions is production schedule data. This data is often structured and defined by the SP95 standard, which allows for consistent data structure across applications. Examples of production schedule data include running capacity of a device (e.g., a device is running at 50% capacity), available parts for making a product, etc. Periodically, this data can be at least part of a transaction directly between the automation controller 102 (which has access to the data and/or stores the data in internal storage) and the business system 104. Particularly, upon receipt of a request for particular procedural data, the request analyzer 106 can review the request and determine which automation controller is related to the requested data. Thereafter, the subscribing component 108 is utilized to open a channel between the automation controller 102 and the business system 104 according to the analysis by the request analyzer 106. After passing of a set period of time or occurrence of a production schedule event, a transaction can be initiated between the automation controller 102 and the business system 104. It is understood that either the automation controller 102 or the business system 104 can initiate the transaction therebetween, and is merely a matter of design choice/convenience.

A third class of data that can be employed in connection with the subject invention is batch operation information. Batch operation typically refers to processes that are employed to make products in bulk or through ingredients. For example, information relating to production of pharmaceuticals would be a batch record. More particularly, a recipe can call for distinct quantities of elements X, Y, and Z. Such distinct quantities can be stored as well as the quantities of X, Y, and Z actually utilized in making a product. Given increased threats of terrorism, it is important that such batch records (e.g., electronic batch recipe records) are accurately generated and stored, and are protected against security breaches. The system 100 of the subject invention is an improvement for security purposes, as middleware is not required for undertaking of a transaction between the automation controller 102 and the business system 104. Rather, the request analyzer 106 and the subscribing component 108 operate in connection to facilitate sending/receiving transactional data directly between the automation controller 102 and the business system 104.

In accordance with an aspect of the subject invention, the automation controller 102 can be a programmable logic controller (PLC). PLCs are small computers that are employed for automating real-world processes (e.g., controlling machinery within an industrial environment). Typically, PLCs are microprocessor-based devices with modular or integral input/output circuitry, wherein such circuitry is utilized to monitor status of field connected sensor inputs, and is further utilized to control output actuators according to a logic program. While PLCs can be utilized within the system 100 as the automation controller 102, it is to be understood that any suitable automation controller can be employed in connection with the subject invention. For example, any suitable microprocessor and/or microcontroller can be utilized within the system 100 as the automation controller 102.

Figure 2:
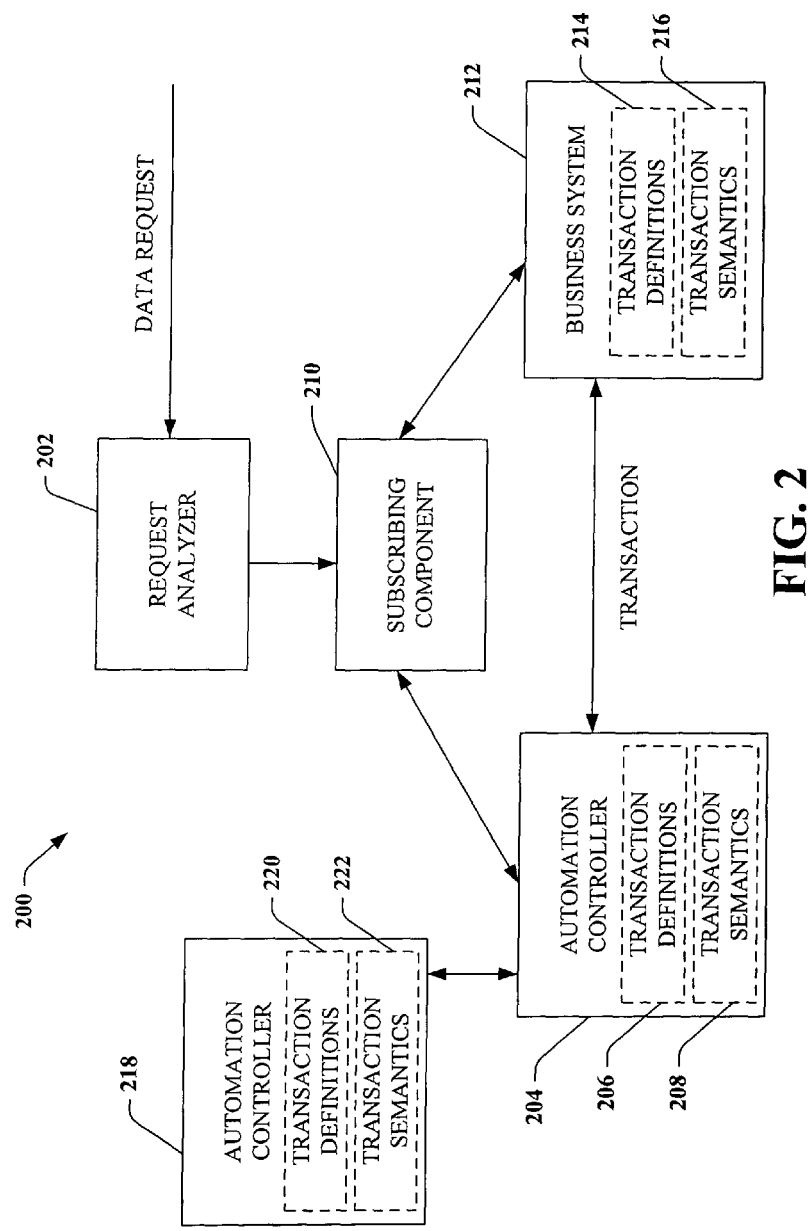
FIG. 2 is a block diagram of a system that facilitates direct communication in a form of a transaction directly between a business system and an automation controller in accordance with an aspect of the subject invention.

Now referring to FIG. 2, a system 200 that facilitates undertaking of a transaction directly between a factory automation controller and a business system or business system database is illustrated. The system 200 includes request analyzer 202 that receives a request for a particular type of data. For example, the request can be for an alarm relating to a particular machine, or for specific batch records. The request analyzer 202 analyzes the request and locates an automation controller 204 that is associated with a transaction that encompasses the data. Specifically, the automation controller 204 is associated with transaction definitions 206 and transaction semantics 208. Such transaction definitions 206 enable the request analyzer 202 to quickly locate a defined transaction based upon a request for specific data and/or data originating from a particular procedure or event. For a particular example, a user may desire to obtain batch information from the execution of a specific portion of a pharmaceutical recipe. A request is made that to the request analyzer 202 to indicate that such data is desired on a periodic basis and/or on occurrence of an event or condition. For instance, the request can originate from an HMI on the factory floor, from a personal computer that operates within a business system, wherein the operator of such computer wishes to receive transactional data within the business system, or any other suitable station where such a request can be made.

Upon the request being analyzed, a subscribing component 210 subscribes the automation controller 204 to a business system 212 according to the initial request. For example, the subscribing component 210 can open a channel between the automation controller 204 and an appropriate database (not shown) within the business system 212. Further, the business system 212 can include transaction definitions 214 and transaction semantics 216, thus enabling the business system 212 to communicate effectively with the automation controller 204. It is not necessary that the business system 212 include explicit transaction definitions 214 and semantics 216, as the automation controller 204 will be configured to appear no different than a disparate business system to the business system 212.

The system 200 also includes another automation controller 218, which, like the automation controller 204, includes transaction definitions 220 and transaction semantics 222 that are pertinent to data associated with the automation controller. Thus, a transaction between the automation controller 218 and the business system 212 could occur without requiring middleware. Further, the automation controller 204 and the automation controller 218 can exchange data utilizing conventional data-exchange methods within an industrial environment. Moreover, the automation controllers 204 and 218 can control factory floor devices without sacrificing operability and/or efficiency while obtaining an ability to have direct transactions with the business system 212.

Figure 3:
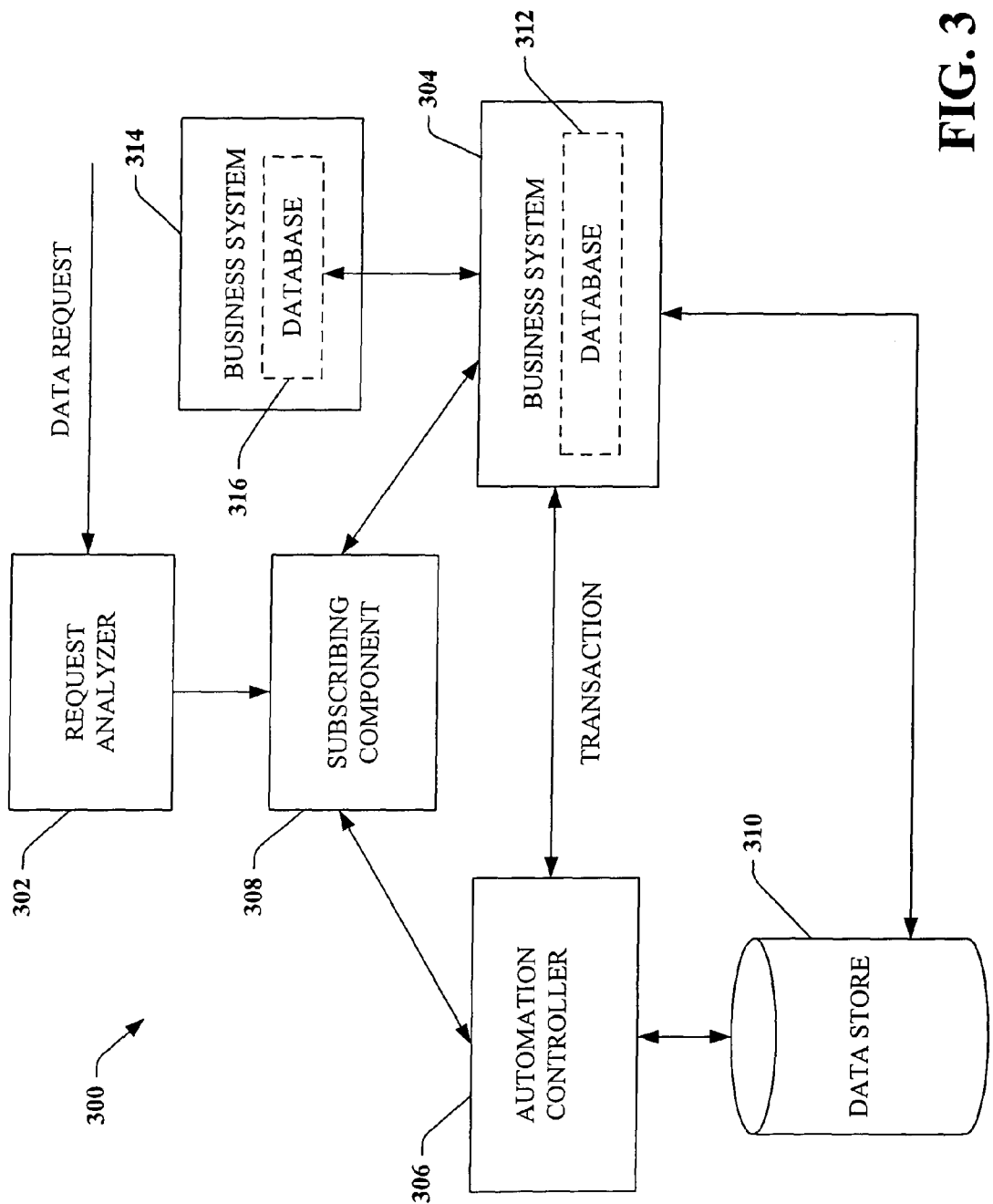
FIG. 3 is a block diagram of a system that facilitates direct communication in a form of a transaction directly between a business system and an automation controller in accordance with an aspect of the subject invention.

Now referring to FIG. 3, a system 300 that facilitates transactions directly between industrial automation equipment and a business system is illustrated. The system 300 includes a request analyzer 302 that receives a request for industrial automation data, such as maintenance data, production schedule data, batch record data, etc. Typically the request will originate from within a business system 304, such as from a business manager or the like. However, it is understood that the request can originate from any suitable source. The request can specify whether the data is desirably received upon occurrence of an event or condition or at periodic intervals. The request analyzer 302 thereafter locates an automation controller 306 that is related to the requested data. In accordance with one aspect of the subject invention, the request analyzer 302 can locate the automation controller 306 via transaction definitions associated with the automation controller 306.

Upon the request analyzer 302 locating the appropriate automation controller 306, a subscribing component 308 is employed to subscribe the business system 304 to the automation controller 306. Particularly, a channel is opened between such automation controller 306 and the business system 304, which allows a transaction to occur directly between the automation controller 306 and the business system 304. The system 300 further includes a data store 310, which can be existent anywhere within an industrial automation system that includes the automation controller 306. For example, the data store 310 can exist at an upper-level Enterprise Resource Planning (ERP) level, at a factory-floor level, or any other suitable location. Data sensed by the automation controller 306 or sensors (not shown) associated therewith can deliver data to the data store 310. The business system 304 can then query the data store 310 to obtain relevant information therefrom, rather than getting data directly from the automation controller 306. However, it is typically more advantageous to obtain data directly from the automation controller 306, as it minimizes possibilities of security breach. The business system 304 also includes a database 312, wherein the transaction between the automation controller 306 and the business system 304 occurs via the database 312.

The system 300 further includes a separate business system 314 that includes a database 316. As the business system 304 treats the automation controller 306 as simply a disparate business system, the business system 304 does not require alteration to receive transactional data from an industrial automation system. Further, the business system 304 can communicate with the business system 314 in a conventional manner. For example, transactions can occur between the database 316 and the database 312 based upon conventional methods. Thus, the business system 304 can enter into and complete transactions with the business system 314 as well as the automation controller 306 without requiring modification thereof.

Figure 4:
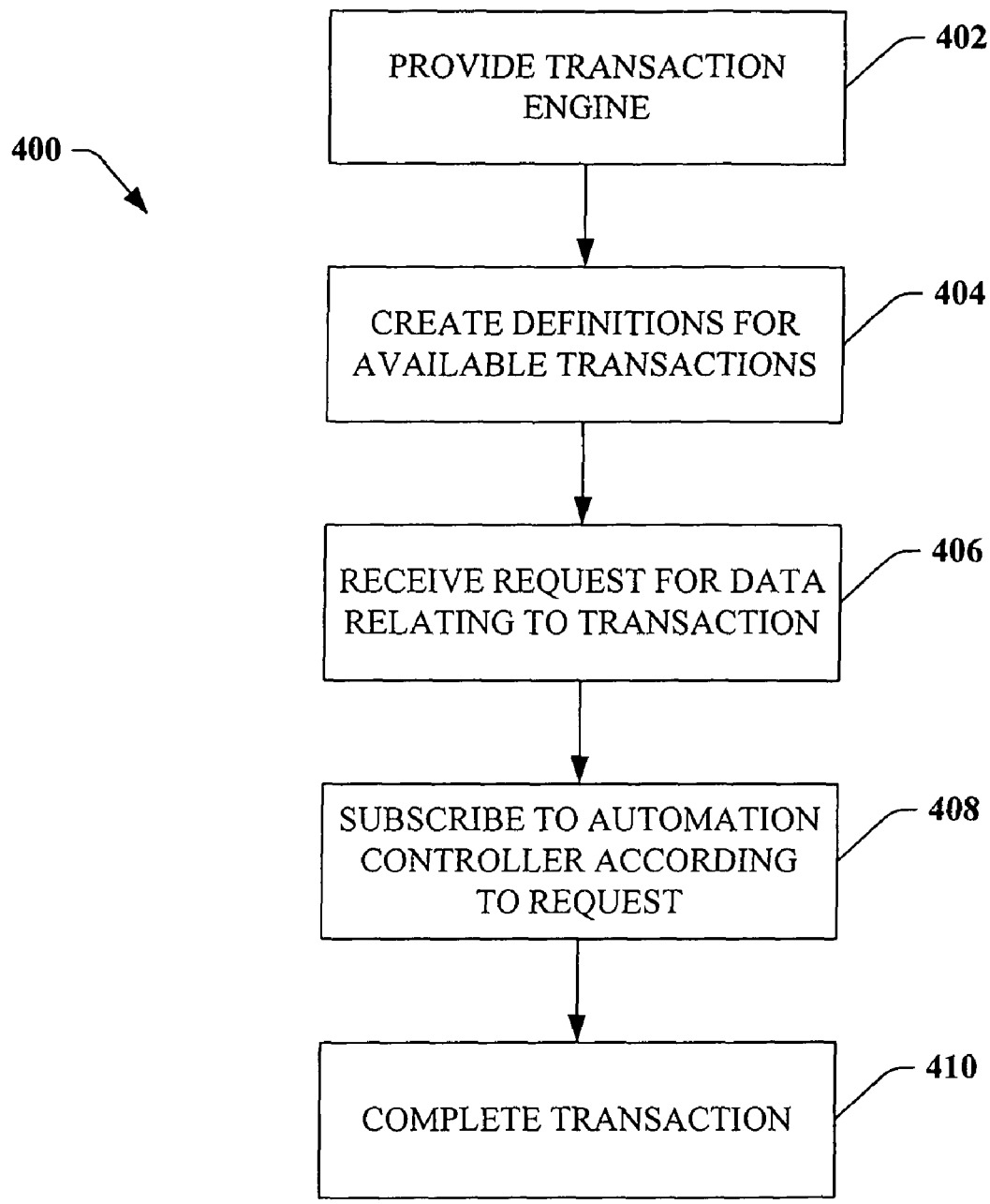
FIG. 4 is a representative flow diagram illustrating a methodology for directly communicating a transaction between an automation controller and a business system in accordance with an aspect of the subject invention.

Turning now to FIG. 4, a methodology 400 for communicating a transaction directly between a business system and an automation controller. While, for purposes of simplicity of explanation, the methodology 400 is shown and described as a series of acts, it is to be understood and appreciated that the subject invention is not limited by the order of acts, as some acts may, in accordance with the subject invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

At 402, a standard transaction engine is provided that facilitates communication between systems and/or databases. For example, a transaction engine that is typically employed between an ATM machine and a bank machine could be utilized in connection with the subject invention. Each of the participating devices and software products within the business system and an industrial automation system would utilize the standard transaction engine. Further, this engine supports standard communications between disparate business system databases.

At 404, definitions for available transactions between an automation controller and a business system are created and associated with the automation controller. For example, the automation controller may be utilized in connection with effectuating/controlling production of a batch process, and receive/generate data relating to such batch process. Therefore, a transaction can be defined relating to data received and/or generated, and a common set of semantics can be utilized in connection with data that is exchanged in the transaction. Thus, the transaction can be effectuated between the automation controller and a business system due at least in part to the common semantics. In a different example, an automation controller may sense or be privy to a certain event or condition, such as an alarm. Accordingly, a transaction can be defined relating to the alarm.

At 406, a request is received for data that relates to a defined transaction. For instance, an individual operating within a business system may desire to receive data relating to an alarm. This request can be paired with a transaction that was defined at 404. A matching algorithm or other suitable software device can be employed to locate a corresponding defined transaction based upon a data request. Alternatively, a graphical user interface can be presented to an individual to assist such individual in locating a desirable transaction.

At 408, the business system subscribes to the automation controller based at least in part upon the received request. More particularly, the business system can include a database that subscribes to the automation controller. Thereafter, a channel can be opened for transactions that relate to the request and the automation controller. For example, upon occurrence of an event or condition (e.g., an alarm), the automation controller can initiate a transaction with the business system (e.g., with a database within the business system). In accordance with another aspect of the subject invention, a transaction can be initiated by the business system upon passage of a pre-defined period of time. Alternatively, the automation controller can initiate the transaction after passage of a particular period of time. At 410, the transaction is completed. For example, multiple queries and writes can occur to ensure that both the automation controller and the business system have received and sent required data. If the transaction fails, such transaction can be rolled back.

Figure 5:
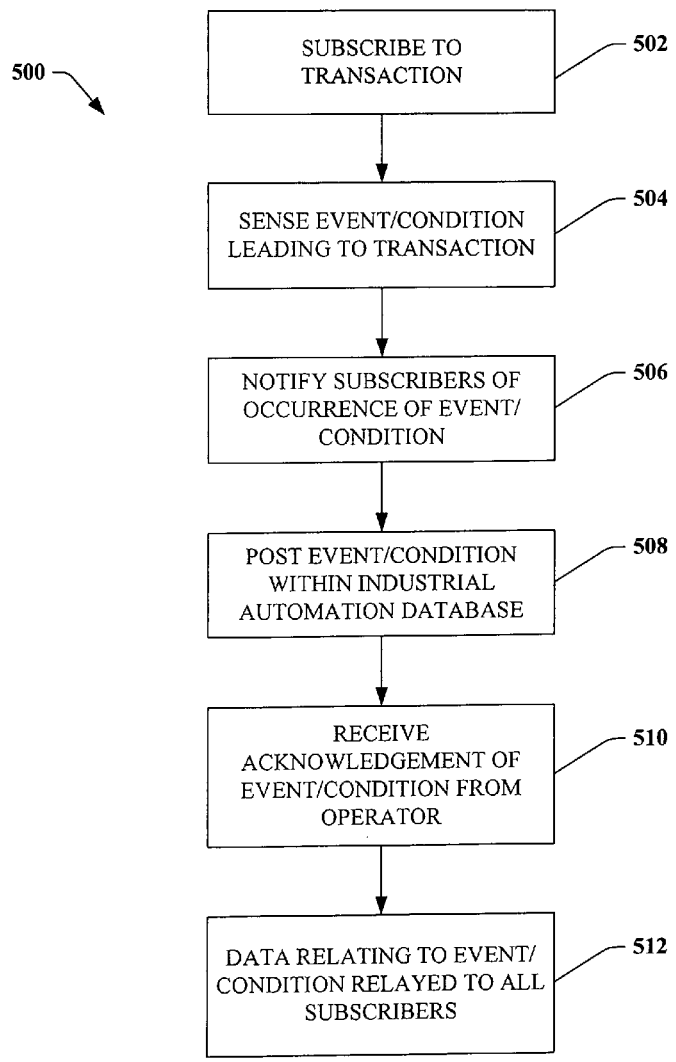
FIG. 5 is a representative flow diagram illustrating a methodology for initializing and completing a transaction directly between an automation controller and a business system in accordance with an aspect of the subject invention.

Now turning to FIG. 5, a methodology 500 for directly communicating a transaction between an industrial automation controller and a business system database is illustrated. At 502, the business system database subscribes to a particular transaction that is related to the automation controller. This subscription can, for example, be based upon a user request for data. At 504, the event or condition leading to the transaction is sensed. For instance, the event or condition can be an occurrence of alarm. Similarly, the event or condition can be a passing of a particular amount of time.

At 506, subscribers to the event or condition are notified of such event or condition. For example, if an alarm occurs, the subscribers to the alarm are notified of the occurrence of such alarm. Similarly, if the passing of defined amount of time has passed, subscribers relating to the lapse of time can be notified of such event. At 508, the event or condition is posted within an industrial automation database. For example, it may be important to post a type of alarm within the industrial automation database to track such alarm. Similarly, it may be desirably to track production records or batch records at intermittent times. Thereafter, the industrial automation database can be queried as is conventional in industrial automation systems.

At 510, an operator can acknowledge an occurrence of the event or condition. This may be desirable due to possibilities of false alarms. If the transaction is delivered based upon passage of time, operator acknowledgement may not be necessary. At 512, data relating to the event or condition is relayed to all subscribers thereto. For example, if an alarm occurs, subscribers desiring communications relating to that alarm will receive data. This communication of data occurs in the form of a transaction, and does not require middleware due to transaction definitions and common transaction semantics stored within an automation controller.

Figure 6:
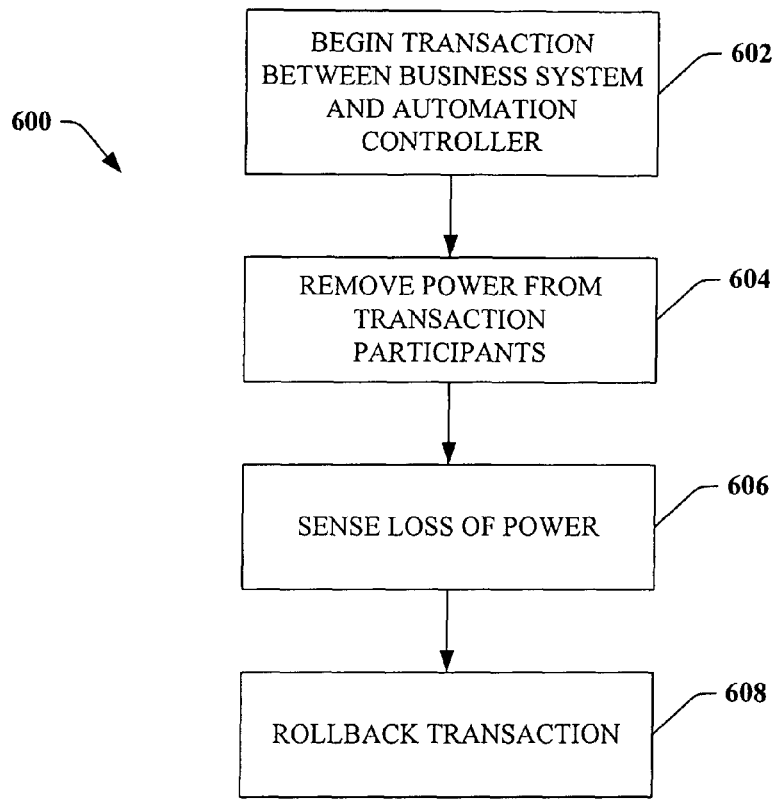
FIG. 6 is a representative flow diagram illustrating a methodology for rolling back a transaction between an automation controller and a business system in accordance with an aspect of the subject invention.

Turning now to FIG. 6, a methodology 600 for rolling back a transaction that is communicated directly between an automation controller and a business system database is illustrated. At 602, a transaction is begun between a business system and an automation controller. In accordance with one aspect of the subject invention, a business system can subscribe to an automation controller, and thereafter be notified upon occurrence of an event or condition. Thereafter, either the business system database or the automation controller can initiate a transaction.

At 604, power is removed from the automation controller and/or the business system database. For example, power lines can be damaged, thus affecting the power supply to one or more of the automation controller and/or the business system database. Further, an Ethernet cable or the like that effectuates communication between the automation controller and the business system database. For instance, if wireless communication techniques are employed between the business system database and the automation controller, damage to a receiver and/or transmitter can result in failed communication between the automation controller and the business system database.

At 606, the loss of power and/or failure of communication is sensed. For instance, the automation controller can sense loss of power with respect to the business system by not receiving a confirmation after a predefined period of time after delivering a data packet. Other suitable power/communication loss sensing techniques are contemplated and can be employed by an automation controller and/or business system database in accordance with the subject invention. At 608, the transaction is rolled back. In conventional systems for communicating transactions between automation systems and business systems, middleware is required to facilitate such transactions. Thus, rolling back a transaction is often problematic given communication failures, occurrences of timing out, power failures, etc. As the transactioning system/methodology of the subject invention facilitates direct communications between an automation controller and a business system database, transactions can more easily be rolled back.

Figure 7:
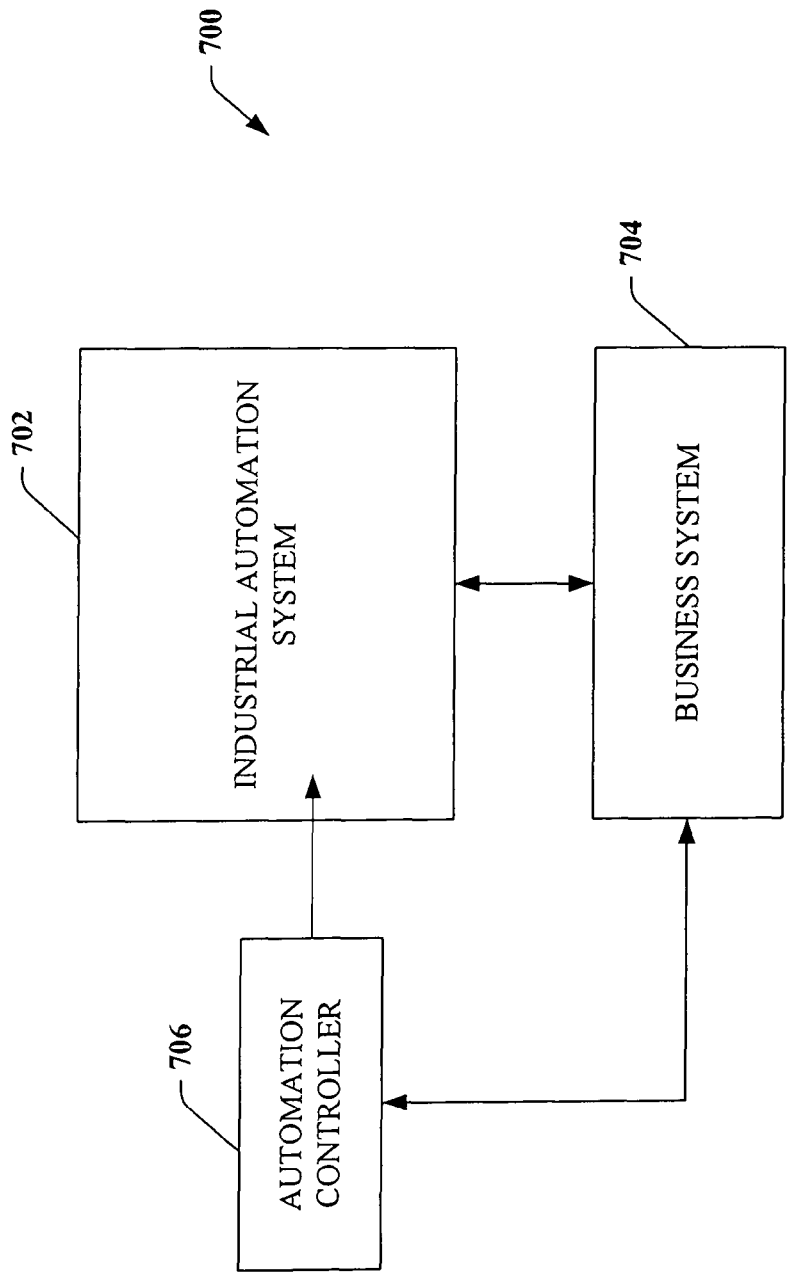
FIG. 7 is a block diagram of a system that illustrates plug and play capabilities of the subject invention.

Now referring to FIG. 7, an exemplary embodiment 700 of the subject invention is illustrated. An industrial automation system 702 is configured in accordance with the subject invention to enable transactions to occur directly between an automation controller within the industrial automation system 702 and a business system 704 (e.g., a database therein). The industrial automation system can include a plurality of automation controllers, human machine interfaces (HMIs), higher-level computer systems, or any other device that conventionally appears in an industrial automation system. Often it is desirable to add another automation controller 706 to the industrial automation system 702. Further, it may be desirable to replace an outdated automation controller with the automation controller 706, which may be an upgrade.

It is desirable, therefore, to enable the automation controller 706 to be automatically loaded with defined transaction definitions, rather than requiring manual programming thereof. For instance, the industrial automation system 702 can be self-aware, and know that the automation controller 706 has been added to the industrial automation system 702. Similarly, the industrial automation system 702 can be aware that an outdated automation controller has been replaced by the automation controller 706. Thereafter, a data store (not shown) within the industrial automation system 702 can be employed to automatically direct transaction definitions to the added automation controller 706. This enables a form of plug-and-play for the automation controller 706 with respect to effectuating a direct transaction between the automation controller 706 and the business system 704. Alternatively, a graphical user interface can be presented to a user upon addition of the automation controller 706, and such user can define transactions that are to be undertaken between the automation controller 706 and the business system 704. Further, semantics for data exchanged between the automation controller 706 and the business system 704 can be loaded within the automation controller automatically upon adding the automation controller 706 to the industrial automation system 702.

Figure 8:
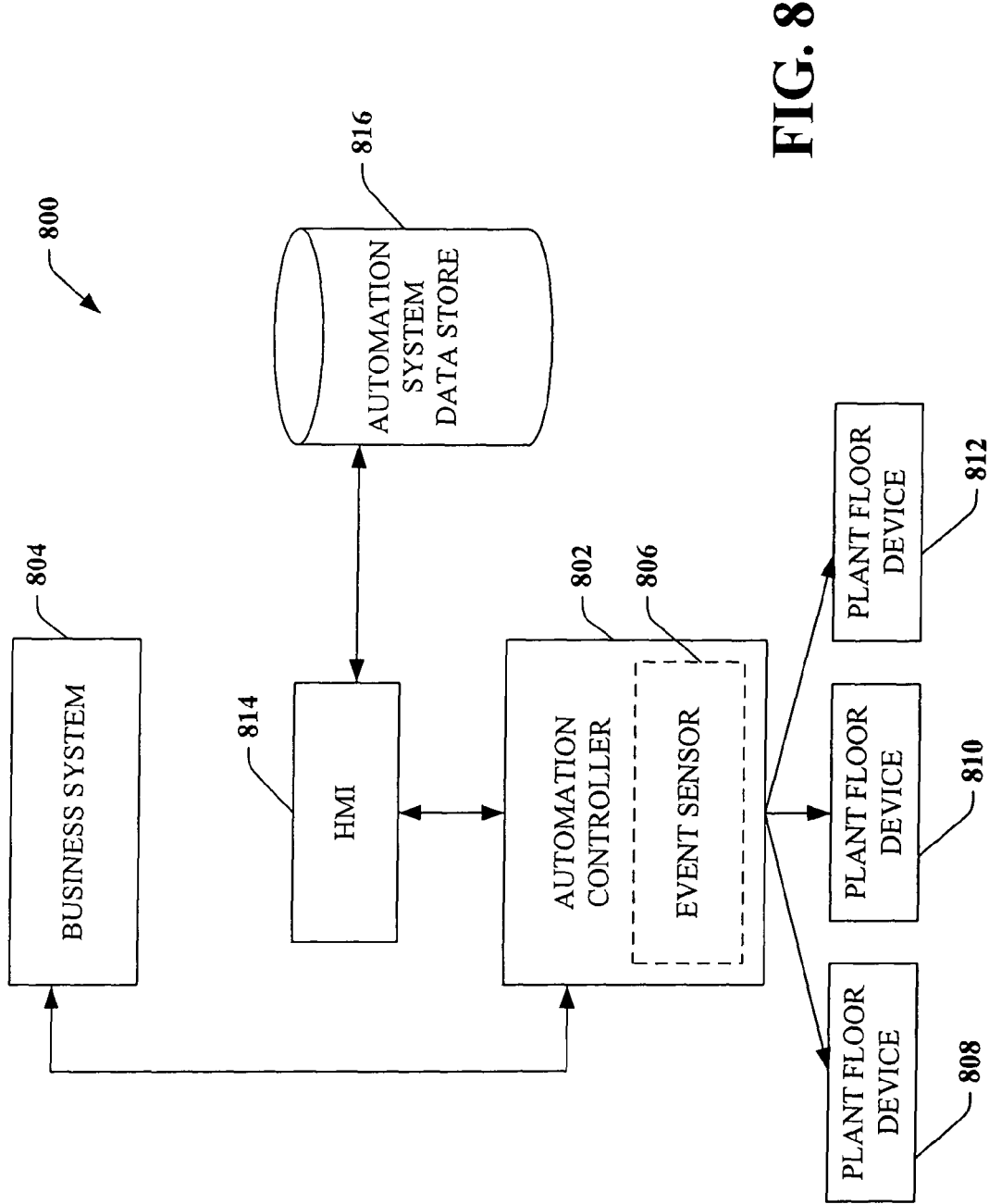
FIG. 8 is a block diagram of a system that facilitates a direct transaction between an automation controller and a business system initiated by an alarm in accordance with an aspect of the subject invention.

Now turning to FIG. 8, a system 800 that facilitates communication of a transaction directly between an automation controller and a business system is illustrated. The system 800 includes an automation controller 802 that desirably communicates in the form of a transaction directly with a business system 804. In the system 800, the transaction is triggered based at least in part upon occurrence of an event, such as an alarm or a passage of time. Accordingly, the automation controller 802 includes or is associated with an event sensor 806 that senses alarms, events, or passages of time. The system 800 is further associated with plant floor devices 808-812, such as pumps, presses, lathes, saws, etc. While three plant floor devices are illustrated, it is to be understood that any suitable number of plant floor devices can be utilized within the system 800. The event sensor 806 monitors the plant floor devices 808-812 and senses occurrence of an event. For example, if plant floor device 808 fails, an alarm will be triggered that is sensed by the event sensor 806. Similarly, the event sensor 806 can determine that a particular amount of time has passed with respect to a process related to one or more of the plant floor devices 808-812.

Upon occurrence of a predefined event that is sensed by the event sensor 806, the automation controller 802 can deliver a notice of the sensed event to a human machine interface (HMI) 814. This enables an operator to review the event and acknowledge such event. This aspect may be important upon occurrence of an alarm. For instance, the event sensor 806 can determine that the plant floor device 808 has suddenly stopped operating, and accordingly alert an operator of a failure of the plant floor device 808 via the HMI 814. However, the failure in operation may not be due to failures associated with the plant floor device 808, but rather to other associated failures (e.g., operator override, lack of parts, ...).

Thus, a condition required for delivering a transaction to the business system 804 may not be met. Accordingly, an operator can review the sensed event and acknowledge occurrence of the event via the HMI 814. Thereafter, the HMI can be employed to facilitate deliverance of data relating to the event to an automation system data store 816 as in conventional systems/methodologies. Acknowledgment of the event can be passed to the automation controller 802, and subscribing business system databases can be notified of such event directly from the automation controller 802, thus beginning a transaction directly therebetween.

Figure 9:
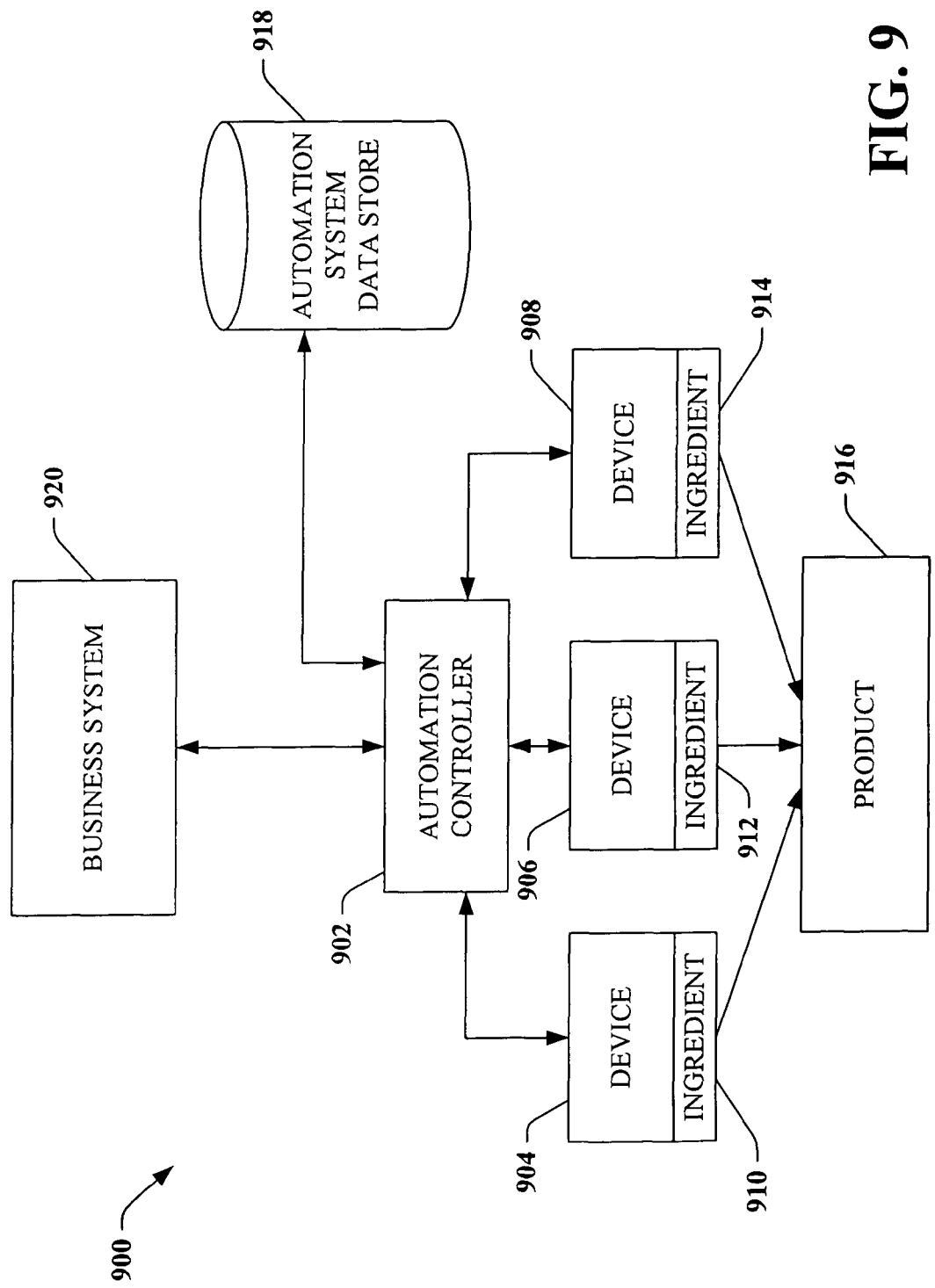
FIG. 9 is a block diagram of a system that facilitates a direct transaction relating to batch record data between an automation controller and a business system in accordance with an aspect of the subject invention.

Turning now to FIG. 9, an exemplary system 900 that facilitates directly communicating a transaction relating to batch records between an automation controller and a business system is illustrated. The system 900 includes an automation controller 902 that controls a plurality of plant floor devices 904-908, which are utilized in connection with placing respective ingredients 910-914 into a product 916. For example, the product 916 can be a food or pharmaceutical product, where maintaining proper batch records relating to creation of the product is extremely important. A recipe for creating the product can be stored in the automation controller 902 and/or within an automation system data store 918. Further, sensors (not shown) can be utilized to monitor amounts of the respective ingredients 910-914 that are placed within the product 916. These monitored amounts can be delivered to the automation controller 902 and thereafter stored within the automation system data store 918.

In some instances, a business system 920 or operator thereof may desire to receive such data directly from the automation controller 902. In accordance with one aspect of the subject invention, a transaction definition related to the product 916 and ingredients therein can be stored within the automation controller 902 or related storage. Thus, the business system 920 can subscribe to the automation controller 902 to enable direct transactions between the automation controller 902 and the business system 920. After subscription, upon occurrence of an event or condition, the automation controller 902 and/or the business system 920 can initiate a direct transaction. In accordance with another aspect of the subject invention, a direct transaction can be initiated between the business system 920 and the automation controller upon a request for such transaction from the business system 920. Thus, an event or condition does not have to be set or determined by sensors and/or the automation controller 902.

Figure 10:
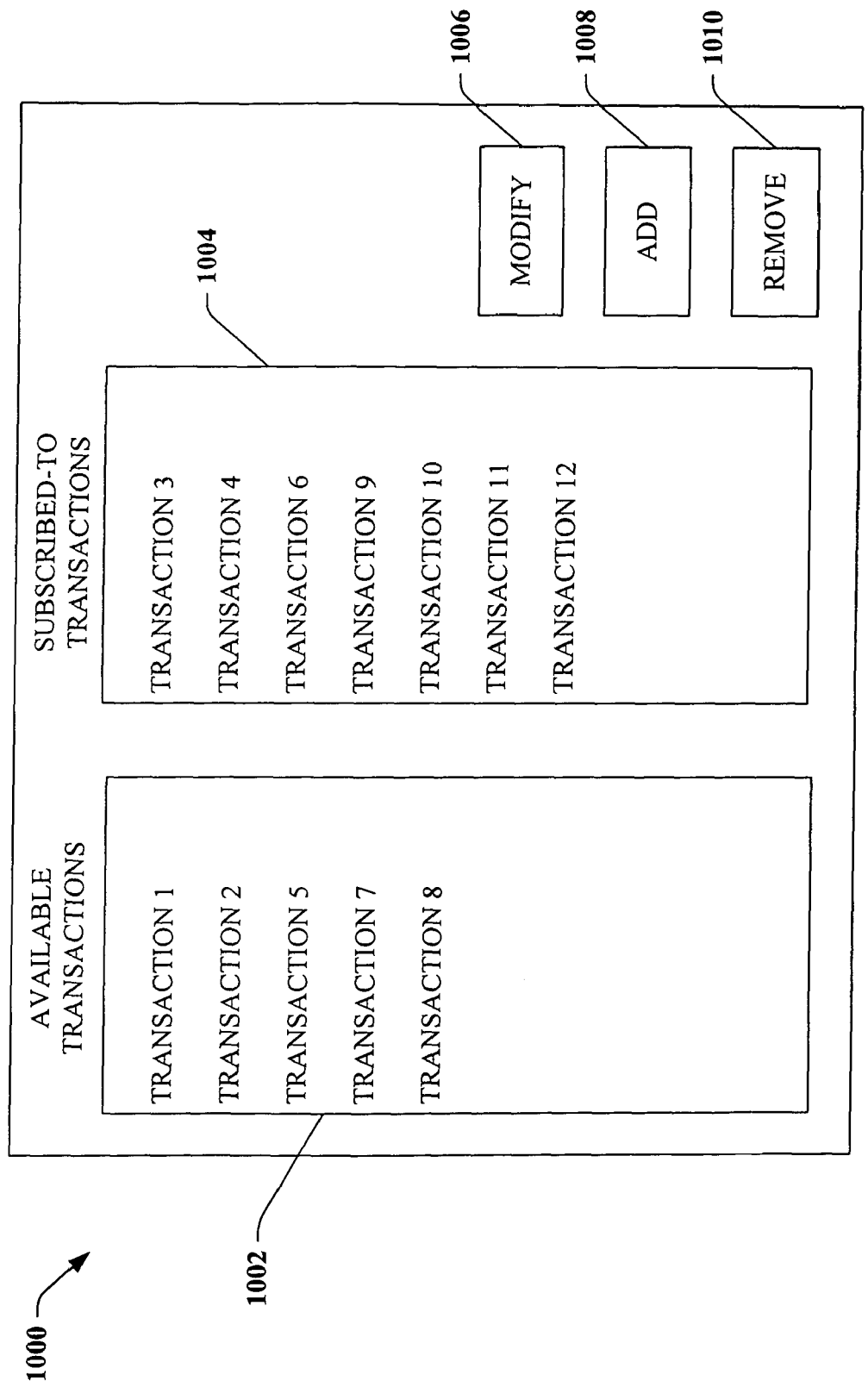
FIG. 10 is an exemplary graphical user interface that can be employed in connection with the subject invention.

Now referring to FIG. 10, an exemplary graphical user interface (GUI) 1000 that can be utilized in connection with the subject invention is illustrated. The GUI 1000 is a representation of defined transactions that are available within an automation controller as well as transactions to which a business system database is subscribed. Thus, for instance, the GUI 1000 can appear within a business system, and allow a business executive or the like to subscribe to available transactions or unsubscribe from transactions that are no longer pertinent.

Particularly, the GUI 1000 includes a listing of available transactions 1002 that are defined within an automation controller. These transaction definitions enable a business system to communicate with an automation controller as if the automation controller were a business system database. Individual transactions within the list of transactions 1002 can be selectable and placed within other lists to allow for ease of modification. For example, one or more transactions can be selected via any suitable selection method (e.g., mouse, touch screen, keystrokes, ...), and then moved to a subscribed-to transactions listing 1004. Thus, with a few brief selections, a new transaction is available between the business system and the automation controller. Similarly, individual listings within the subscribed-to transactions listing 1004 can be selected and moveable to other listings (e.g., the available transactions listing 1002).

The GUI 1000 further includes a modify button 1006, an add button 1008, and a remove button 1010. Thus, a user can select one or more of the individual transactions within the listings 1002 and 1004 and quickly modify, add, or delete such transactions. For a specific example, transaction 3 may be a transaction based upon occurrence of an alarm relating to a particular factory floor device. The user may, however, wish to receive a transaction relating to a disparate machine. Accordingly, the user can select transaction 3, select the modify button 1006, and thereafter modify the transaction 3 to relate to the disparate factory floor device. Similarly, transactions can be added to an automation controller or deleted from an automation controller by employing the add butting 1008 and the remove button 1010, respectively.

Figure 11:
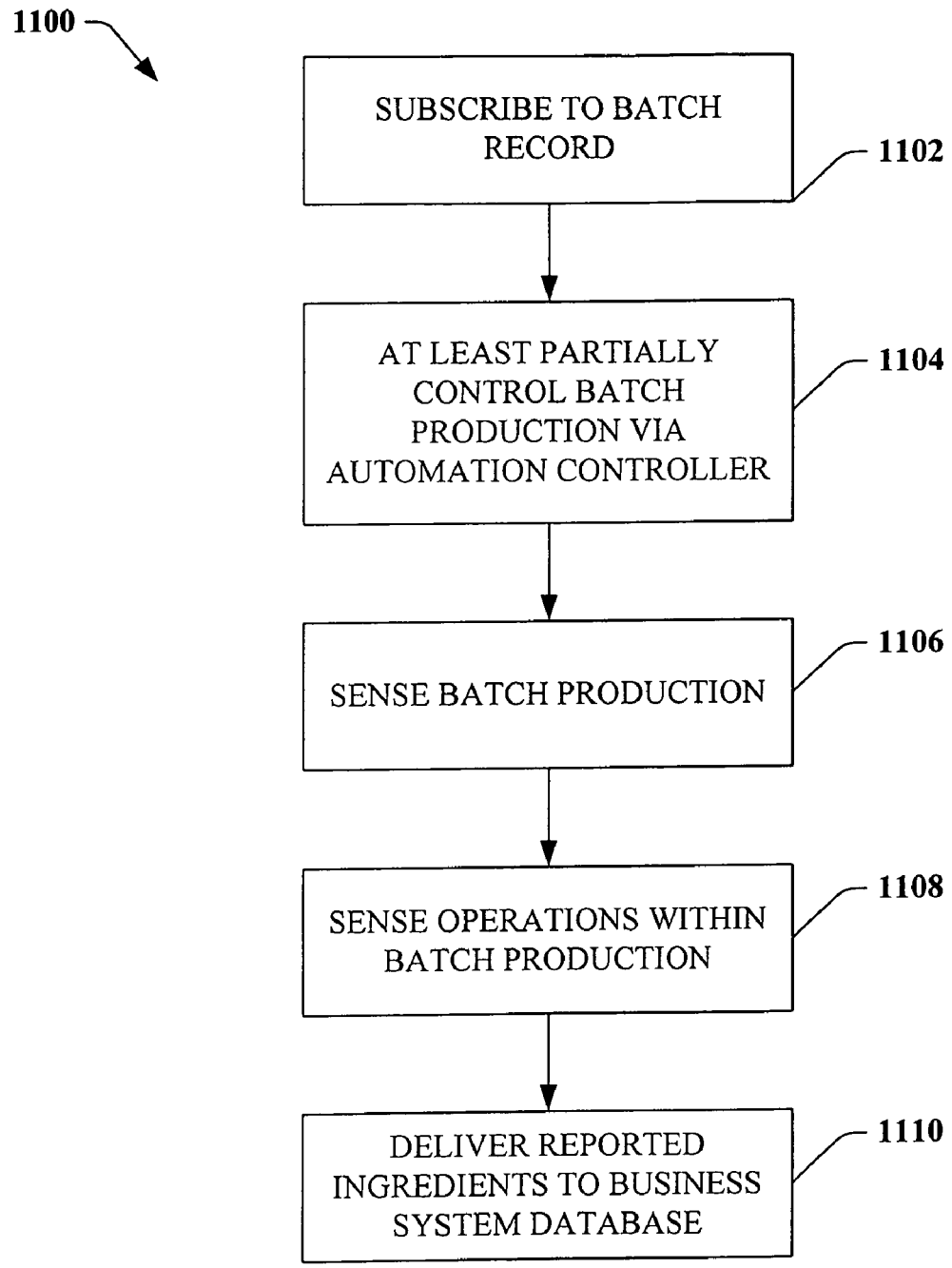
FIG. 11 is a representative flow diagram of a methodology for communicating batch record data directly between an automation controller and a business system in accordance with an aspect of the subject invention.

Referring now to FIG. 11, a methodology for enabling a transaction between an automation controller and a business system database with respect to batch records information is illustrated. At 1102, the business system database subscribes to the batch record. For example, the batch record can relate to production of pharmaceutical products, food products, or any other product that can be consumed, ingested, injected, etc. The subscription is based upon a predefined transaction within an automation controller related to the batch record information. This transaction can be stored within the automation controller or a database related thereto, and the transaction can be associated with predefined semantics. Therefore, the business system can perform transactions with the automation controller as if the automation controller were a business system.

At 1104, batch production of the product is at least partially controlled by the automation controller. For example, one or more operations involving ingredients can be under control of the automation controller. At 1106, batch production of an item is begun, and at 1108 a particular operation within the batch production is sensed. For example, if a recipe of an item being produced requires a certain quantity of one particular ingredient, the sensors will monitor an operation to determine amount of such ingredients and report the determined amount to the automation controller. At 1110, the reported ingredients are delivered to a business system database that subscribed to the batch production record. For example, at intermittent times, the automation controller can deliver batch record data to the business system in transactional format, wherein semantics of such transaction and the transaction itself are defined within the automation controller.

Figure 12:
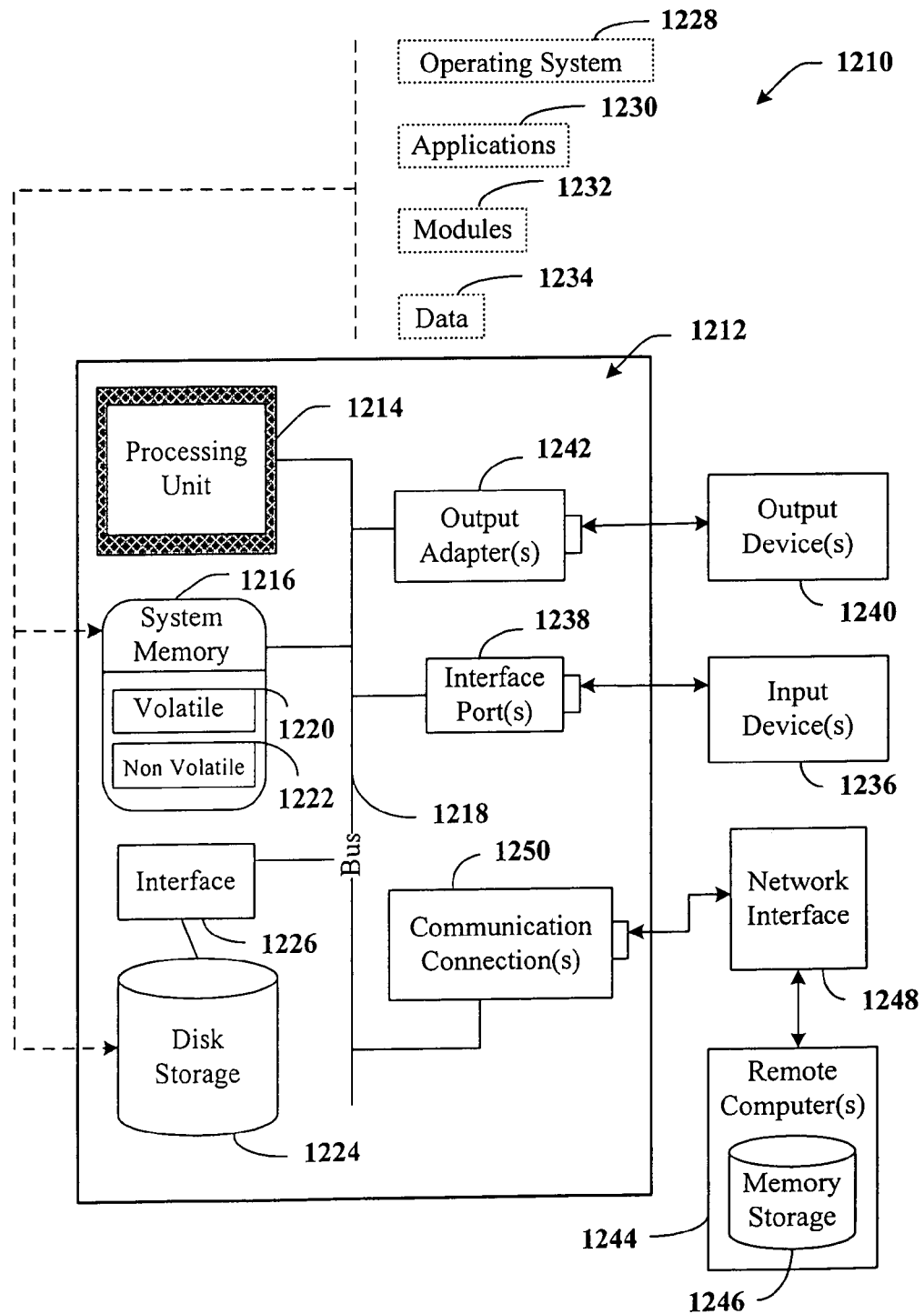
FIG. 12 is an exemplary operating environment that can be employed in connection with the subject invention.

With reference to FIG. 12, an exemplary environment 1210 for implementing various aspects of the invention includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable ROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/non-removable, volatile/non-volatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in suitable operating environment 1210. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the subject invention can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

Figure 13:
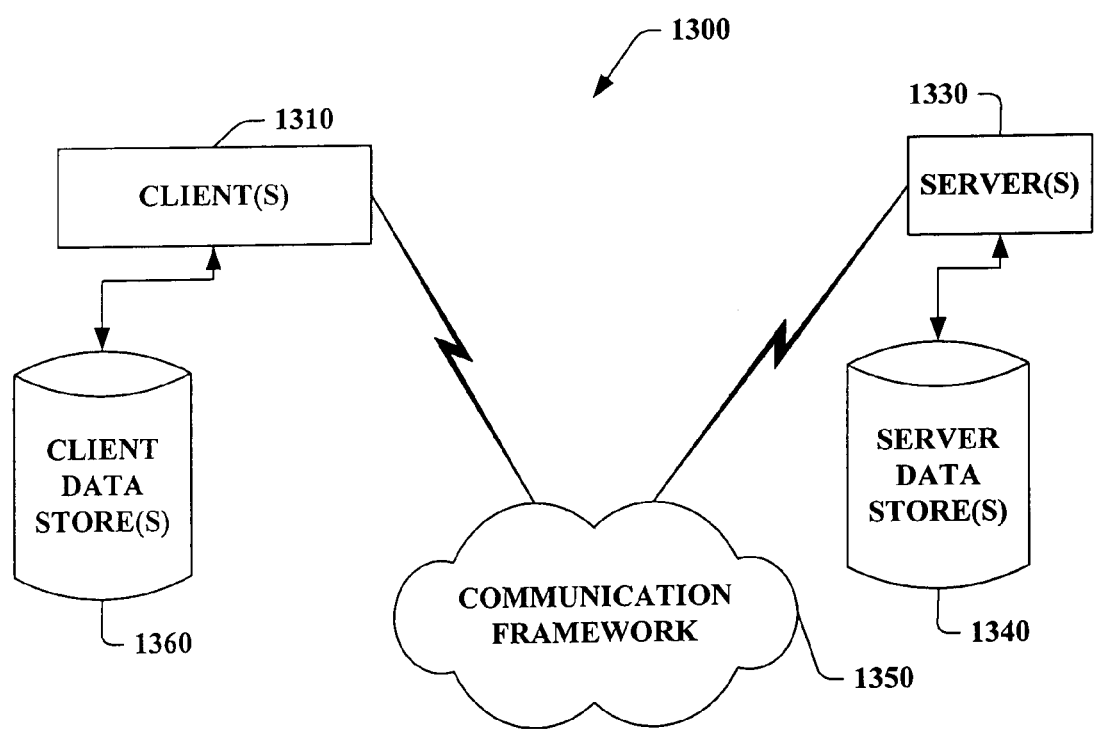
FIG. 13 is an exemplary operating environment that can be employed in connection with the subject invention.

FIG. 13 is a schematic block diagram of a sample-computing environment 1300 with which the subject invention can interact. The system 1300 includes one or more client(s) 1310. The client(s) 1310 can be hardware and/or software (e.g., threads, processes, computing devices). The system 1300 also includes one or more server(s) 1330. The server(s) 1330 can also be hardware and/or software (e.g., threads, processes, computing devices). The servers 1330 can house threads to perform transformations by employing the subject invention, for example. One possible communication between a client 1310 and a server 1330 can be in the form of a data packet adapted to be transmitted between two or more computer processes. The system 1300 includes a communication framework 1350 that can be employed to facilitate communications between the client(s) 1310 and the server(s) 1330. The client(s) 1310 are operably connected to one or more client data store(s) 1360 that can be employed to store information local to the client(s) 1310. Similarly, the server(s) 1330 are operably connected to one or more server data store(s) 1340 that can be employed to store information local to the servers 1330.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates direct communication of a transaction between an industrial automation controller and a business system, comprising:
  a processor;
  a memory communicatively coupled to the processor, the memory having stored therein computer-executable instructions that when executed by the processor cause the processor to perform the following steps of:
  storing a plurality of transaction definitions in the industrial automation controller, wherein each transaction definition specifying a common set of semantics between the business system and the industrial automation controller for a transaction associated with the transaction definition;
  receiving a request for a transaction relating to the industrial automation controller, wherein the requested transaction generates multiple occurrences of at least one of writing data to or extracting data from the industrial automation controller and the business system prior to completion of the requested transaction;
  locating a transaction definition within the industrial automation controller associated with the requested transaction;
  subscribing the business system to the automation controller based at least in part upon the located transaction definition, wherein subscribing includes generating a direct transactional communication channel between the business system and the automation controller by employing the common set of semantics specified by the transaction definition;
  initiating the requested transaction by using the communication channel;
  determining that the requested transaction has not been completed based upon a failure of at least one of the multiple occurrences of the at least one of writing data or extracting data; and
  in response to determining that the transaction has not been completed, rolling back to a state prior to the requested transaction initiating in both the industrial automation controller and the business system.

2. The system of claim 1, the requested transaction is within a maintenance class of data.

3. The system of claim 2, the requested transaction is an alarm.

4. The system of claim 3, the requested transaction initiated between the industrial automation controller and the business system upon the industrial automation controller receiving the alarm.

5. The system of claim 1, the requested transaction is within a production schedule class of data.

6. The system of claim 1, the requested transaction initiated between the industrial automation controller and the business system upon passage of a predefined amount of time.

7. The system of claim 1, the requested transaction is within a batch record class of data.

8. The system of claim 7, the data includes an electronic batch recipe report.

9. The system of claim 8, the data includes sensed data relating to a product created via a recipe.

10. The system of claim 1, the requested transaction originates from a user.

11. The system of claim 1, the requested transaction originates automatically from software.

12. The system of claim 1, the industrial automation controller communicates with a disparate industrial automation controller.

13. The system of claim 1, the business system communicates with a disparate business system.

14. The system of claim 1, the business system is an Enterprise Resource Planning system.

15. The system of claim 1, the industrial automation controller is a programmable logic controller.

16. The system of claim 1, automatically loading the industrial automation controller with the plurality of transaction definitions upon being connected to an industrial automation system.

17. The system of claim 1, further comprising an event or condition leading to an acknowledge of the previously initiated transaction.

18. The system of claim 1, the plurality of transaction definitions modifiable via a graphical user interface.

19. A method for direct communication of a transaction between an industrial automation controller and a business system, comprising:
   storing, by a device including a processor, a plurality of transaction definitions in the industrial automation controller, wherein each transaction definition specifying a common set of semantics between the business system and the industrial automation controller for a transaction associated with the transaction definition;
   receiving, by the device, a request for a transaction relating to the industrial automation controller, wherein the requested transaction generates multiple occurrences of at least one of writing data to or extracting data from the industrial automation controller and the business system prior to completion of the requested transaction;
   locating, by the device, a transaction definition within the industrial automation controller associated with the requested transaction;
   subscribing, by the device, the business system to the automation controller based at least in part upon the located transaction definition, wherein subscribing includes generating a direct transactional communication channel between the business system and the automation controller by employing the common set of semantics specified by the transaction definition;
   initiating, by the device, the requested transaction using the communication channel;
   determining, by the device, that the requested transaction has not been completed based upon a failure of at least one of the multiple occurrences of the at least one of writing data or extracting data; and
   in response to determining that the transaction has not been completed, rolling back, by the device, to a state prior to the requested transaction initiating in both the industrial automation controller and the business system.

20. The method of claim 19, the requested transaction is within a maintenance class of data.

21. The method of claim 19, the requested transaction is an alarm.

22. The method of claim 19, the requested transaction initiated between the industrial automation controller and the business system upon the industrial automation controller receiving the alarm.

23. The method of claim 19, the requested transaction is within a production schedule class of data.

24. The method of claim 19, the requested transaction initiated between the industrial automation controller and the business system upon passage of a predefined amount of time.

25. The method of claim 19, the business system is an Enterprise Resource Planning system.

26. The method of claim 19, further comprising automatically loading the industrial automation controller with the plurality of transaction definitions upon being connected to an industrial automation system.

27. A non-transitory computer readable storage medium having stored thereon computer executable instructions that when executed by a processor cause the processor to perform operations comprising:
   storing a plurality of transaction definitions in the industrial automation controller, wherein each transaction definition specifying a common set of semantics between the business system and the industrial automation controller for a transaction associated with the transaction definition;
   receiving a request for a transaction relating to the industrial automation controller, wherein the requested transaction generates multiple occurrences of at least one of writing data to or extracting data from the industrial automation controller and the business system prior to completion of the requested transaction;
   locating a transaction definition within the industrial automation controller associated with the requested transaction;
   subscribing the business system to the automation controller based at least in part upon the located transaction definition, wherein subscribing includes generating a direct transactional communication channel between the business system and the automation controller by employing the common set of semantics specified by the transaction definition;
   initiating the requested transaction using the communication channel;
   determining that the requested transaction has not been completed based upon a failure of at least one of the multiple occurrences of the at least one of writing data or extracting data; and
   in response to determining that the transaction has not been completed, rolling back to a state prior to the requested transaction initiating in both the industrial automation controller and the business system.

28. The non-transitory computer readable storage medium of claim 27, wherein the operations further comprise automatically loading the industrial automation controller with the plurality of transaction definitions upon being connected to an industrial automation system.

* * * * *